United States Patent Office 3,545,995
Patented Dec. 8, 1970

3,545,995
METHOD OF DISPERSING FINE POWDERS
Kenichi Hattori, Masataka Dehara, and Katuo Sugimoto, Wakayama-shi, Japan, assignors to Kao Soap Co., Ltd., Chuo-ku, Tokyo, Japan and Sugai Chemical Industry Co., Ltd., Wakayama-shi, Japan, both corporations of Japan
No Drawing. Filed July 31, 1967, Ser. No. 657,078
Claims priority, application Japan, Aug. 1, 1966, 41/50,753
Int. Cl. C09c 3/02
U.S. Cl. 106—308                           2 Claims

ABSTRACT OF THE DISCLOSURE

A method of dispersing hydrophilic fine solid particles in which a polymaleic acid or its water-soluble salt represented by the following formula:

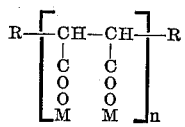

wherein $n$ is an integer of about 4 to 50, M is hydrogen, an alkali metal or ammonium and R is an initiator radical or a solvent fragment is used as a dispersing agent.

BACKGROUND OF THE INVENTION

Field of the invention

This invention relates to a method of stably dispersing solid fine particles, particularly hydrophilic fine particles, in an aqueous medium system by using a polymaleic acid or salts thereof as a dispersing agent.

Description of the prior art

It is generally considered that a dispersing agent will be adsorbed on the surfaces of dispersed particles in a stable suspension system and will stabilize the dispersion system by increasing the surface potential of the particles and the solvation or the steric protective action by the adsorbed molecules. Among conventional substances used as dispersing agents in aqueous medium systems are such alkaline inorganic compounds as silicates and condensed phosphates, such natural high molecular weight substances as ligninsulfonates, nitrohumic acid and alginates and synthetic surface active agents. Recently, high molecular weight-type dispersing agents such as, for example, water-soluble salts of polyacrylic acids and maleic acid copolymers have also been used. However, they show their dispersing characteristics only in a very narrow range depending on the kind of substance to be dispersed and depend so much on the concentration of the dispersing agent to be added to the dispersion system, that they involve many problems in practice.

SUMMARY OF THE INVENTION

On the basis of our discovery that a polymaleic acid has a very strong dispersing ability, the present invention provides a valuable and practical method of dispersing fine powders, particularly hydrophilic fine powders, in an aqueous medium system by using a polymaleic acid or water-soluble salts thereof.

The polymaleic acid or salts thereof used in the present invention is represented by the following formula:

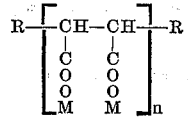

wherein $n$ is an integer of about 4 to 50, preferably about 10 to 20, M is hydrogen, an alkali metal or ammonium and R is an initiator radical or solvent fragment.

Polymaleic acid and its salts are strongly hydrophilic, high molecular weight compounds having a carboxyl radical for each carbon atom of its straight chain. It is easy to adjust the dispersiveness by adjusting the ratio of the free carboxyl radical contained in the polymer molecule.

It was known in the art that a 1,2-disubstituted ethylene compound is hard to polymerize alone and it was believed therefore that maleic anhydride would not form a polymer. However, J. L. Lang et al. reported in 1961 that a homopolymer had been obtained, though at a low yield, by using benzoyl peroxide, ultraviolet rays or gamma rays for the initiation of the polymerization. J. L. Lang, W. A. Pavetich and H. D. Clarey: Abstract of A.C.S. National Meeting, No. 140, 1961, 30.

We have discovered that polymaleic acid is excellent as a dispersing agent in aqueous medium systems, and we have found a method by which to obtain said polymaleic acid at a high yield under reaction conditions which are easier to carry out than any known method.

Hydrophilic powders which can be dispersed in an aqueous medium system with the dispersing agent of the present invention include fine powders used extensively in various products, such as foods, medicines, agricultural chemicals, dyes, pigments, paints, fibers (of colored polyamide or acryl fiber etc.) and civil engineering and building materials such as, for example, powders of starch, wheat flour, chlorella, clay, kaolinite, pyrophyllite, iron oxide, calcium carbonate, barium carbonate, zinc oxide, titanium white, Hansa yellow, gypsum and cement. The polymaleic acid or salts thereof in the present invention includes from an oligomer to polymers of quasi-high molecular weight range obtained by any known method or by a method according to which maleic anhydride is dissolved in toluene and is polymerized at about 90° C. by adding a radical catalyst, such as benzoyl peroxide. The resulting product has the above formula in which $n$ is about 4 to 50. Further, in said general formula, R is an initiator radical, for which various organic peroxides such as benzoyl peroxide, caprylyl peroxide, lauroyl peroxide, P,P'-dichlor-benzoyl peroxide, methylethyl-ketone peroxide and cumenehydro peroxide could be used. Among them acyloyl peroxides such as benzoyl peroxide are preferable.

Or, R is a solvent fragment, for which solvents such as toluene, benzene, xylene, dioxane and acetic acid anhydride could be used. Among them, toluene is most preferable.

It will be understood that the above formula includes the R radicals because the ends of a polymer prepared by radical polymerization in a solvent will be occupied by an initiator radical or a solvent fragment. However, R does not have much significance to the properties of the material so the formula can be written without R.

Said polymaleic acid or its salt is generally used in an amount of 0.1–10 weight percent based on the weight of the fine particles to be dispersed, though the most suitable amount will be different within said limits according to the kinds of the hydrophilic solid fine particles to be used or the pH of aqueous mediums containing said fine particles.

Particularly, titanium white could be dispersed sufficiently in an aqueous medium by using said polymaleic acid or its salt as dispersing agent in an amount of 0.1–0.4 weight percent based on the weight of titanium white. It can be used to disperse hydrophilic solid fine particles such as those widely used in practice in the many industrial fields mentioned above. It shows a remarkable effect particularly in the dispersion of inorganic pigments, such as titanium white, zinc oxide and calcium carbonate, in an aqueous medium system.

DESCRIPTION OF THE PREFERRED EMBODIMENTS

Examples of the present invention shall be described in the following. However, the present invention is not limited to the specific details of these examples.

Example 1

One hundred g. of maleic anhydride of a purity of 99% were put into a 1-liter flask provided with a stirrer and 100 cc. of toluene were added thereto. The maleic anhydride was dissolved in the toluene at a temperature of between 60° and 65° C. A predetermined amount of benzoyl peroxide dissolved in 50 cc. of toluene was immediately added to the solution. These materials were made to react for three hours while the temperature was kept at 90° to 95° C. After the completion of the polymerization, toluene was distilled away at 110° to 115° C. and about 80% was recovered. Then, while the residue was being dropped into 200 cc. of boiling water, additional toluene was recovered by steam distillation. The remaining polymaleic acid solution was adjusted to a pH of six to seven with a solution of about 40% caustic soda and then it was filtered and dried, thus producing a dispersing agent ready for use.

In the above-mentioned reaction, when the amount of benzoyl peroxide (BPO) used was varied, the dispersability characteristics of the dispersing agents were produced as shown in Table I.

TABLE I

| Sample No. | Mol ratio of BPO to maleic anhydride | Degree of polymerization $(n)^2$ | Viscosity in cp. of the dispersion system [1] | | |
|---|---|---|---|---|---|
| | | | 1.0 (g.)[3] | 3.0 (g.)[3] | 5.0 (g.)[3] |
| 1 | 0.04 | | | 680 | 880 |
| 2 | 0.06 | 9.5 | 22.0 | 54.5 | 85.0 |
| 3 | 0.07 | | 15.0 | 43.0 | 650 |
| 4 | 0.075 | 11.6 | 13.0 | 37.0 | 56.5 |
| 5 | 0.1 | 7.7 | 14.0 | 40.8 | 73.1 |
| 6 | 0.15 | | 13.3 | 43.3 | 61.0 |

[1] Apparent viscosity in centipoises measured by a B-type viscosimeter when the dispersing agent was added to a system of 100 g. of ZnO+100 g. of water at 30±0.5° C.

[2] $n$ was calculated from the following formula:

$$n = \frac{\text{molecular weight measured by the Rast method}}{98}$$

[3] Amount in grams of dispersing agent added.

Example 2

When 1.0 g. of the Sample No. 3 in Example 1 was added to a system of 100 g. of zinc oxide and 100 g. of water, the relation between the pH of the dispersion system and the viscosity of the dispersion system was as shown in Table II.

TABLE II

| pH | Viscosity in c.p.s.[1] |
|---|---|
| 4.0 | >20.0 |
| 5.0 | 22.0 |
| 6.3 | 14.0 |
| 7.6 | 20.0 |
| 8.5 | 32.0 |
| 9.5 | 71.5 |
| 10.9 | 143.0 |

[1] Measured by a B-type viscosimeter at 30+0.5° C.

Example 3

When different amounts of Sample No. 4 from Example 1 were added to a system of 120 g. of titanium white and 80 g. of water, the viscosity of the dispersion was measured. Similar tests were carried out with a commercial high molecular weight dispersing agent. The results were as shown in Table III.

TABLE III

| | Amount in g. of the dispersing agent | Viscosity in cps.[1] |
|---|---|---|
| Sample No. 4 | 0.15 | 72.0 |
| Do | 0.2 | 18.0 |
| Do | 0.35 | 23.0 |
| Do | 0.30 | 34.0 |
| Do | 0.40 | 53.5 |
| A commercial high molecular weight dispersing agent | 0.15 | 80.0 |
| Do | 0.2 | 40.0 |
| Do | 0.25 | 44.0 |
| Do | 0.3 | 55.0 |
| Do | 0.4 | 84.0 |

[1] Measured by a B-type viscosimeter at 30±0.5° C. (The pH of the dispersion was adjusted to neutral.)

Example 4

When various amounts of Sample No. 3 from Example 1 were added to a system consisting of 100 g. of calcium carbonate (all passing through 200 meshes) and 100 g. of water, the variation of the viscosity was measured. Similar tests were carried out with a commercial aromatic sulfonic acid-formaldehyde condensate-type dispersing agent. The results were as shown in Table IV.

TABLE VI

| | Viscosity in cps.[1] | |
|---|---|---|
| Amount in g. of dispersing agent added | Sample No. 3 | A commercial dispersing agent of aromatic sulfonic acid-formaldehyde condensate type |
| 0.2 | 110 | <300 |
| 0.25 | 51.0 | |
| 0.3 | 27.0 | 104.0 |
| 0.4 | 13.5 | 69.5 |
| 0.5 | 8.0 | 35.0 |

[1] Measured by a B-type viscosimeter at 30±0.5°C. (The pH of the slurry was adjusted to neutral.)

The embodiments of the invention in which an exclusive property or privilege is claimed are defined as follows:

1. A composition of matter consisting essentially of an aqueous dispersion of hydrophilic solid fine particles and containing from about 0.1 to about 10 percent by weight, based on the weight of said fine particles, of a dispersing agent selected from the group consisting of polymaleic acid and water-soluble salts thereof represented by the following formula:

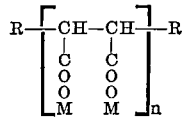

wherein $n$ is an integer of about 4 to 50, M is selected from the group consisting of hydrogen, an alkali metal and ammonium and R is an initiator radical or a solvent fragment.

2. A composition of matter according to claim 1, in which the fine particles consist of titanium white and in which the dispersing agent is present in an amount in the range of about 0.1 to about 0.4 percent by weight, based on the weight of titanium white.

References Cited

UNITED STATES PATENTS 3,359,246  12/1967  Berry _____ 260—78.4
3,385,834  5/1968   Merijan _____ 260—78.4

JAMES E. POER, Primary Examiner

U.S. Cl. X.R.

106—309